United States Patent [19]
Tsukamoto

[11] Patent Number: 4,839,244
[45] Date of Patent: Jun. 13, 1989

[54] MAGNETIC RECORDING MEDIUM WITH PROTECTIVE LAYER USING GRAPHITE FLUORIDE AND METHOD OF PRODUCING SAME

[75] Inventor: Yuji Tsukamoto, Tokyo, Japan
[73] Assignee: NEC Corporation, Japan
[21] Appl. No.: 181,232
[22] Filed: Apr. 13, 1988

[30] Foreign Application Priority Data

Apr. 24, 1987 [JP] Japan .................. 62-99899

[51] Int. Cl.$^4$ .............................................. G11B 5/64
[52] U.S. Cl. ................................. 428/694; 428/695; 428/900
[58] Field of Search ............... 428/408, 695, 694, 329

[56] References Cited

U.S. PATENT DOCUMENTS

| | | | |
|---|---|---|---|
| 4,411,963 | 10/1983 | Aine | 428/900 |
| 4,503,125 | 3/1985 | Nelson | 428/694 |
| 4,554,217 | 11/1985 | Grimm | 428/900 |
| 4,556,604 | 12/1985 | Ohbayashi | 428/900 |
| 4,621,016 | 11/1986 | Kawata | 428/900 |
| 4,647,494 | 3/1987 | Meyerson | 428/900 |
| 4,680,218 | 7/1987 | Kimura | 428/694 |
| 4,713,279 | 12/1987 | Fujiwara | 428/900 |

FOREIGN PATENT DOCUMENTS

| | | |
|---|---|---|
| 156931 | 12/1981 | Japan. |
| 258727 | 12/1985 | Japan. |
| 210516 | 9/1986 | Japan. |

*Primary Examiner*—Paul J. Thibodeau
*Attorney, Agent, or Firm*—Laff, Whitesel, Conte & Saret

[57] ABSTRACT

In a magnetic recording medium such as a magnetic disk, a protective coating excellent in both mechanical durability and corrosion resistance is provided on a layer of a magnetic recording material, which may be a metal film, by jointly using graphite fluoride and an inorganic nonmetallic hard compound which can be selected from oxides such as $SiO_2$ and $Al_2O_3$, nitrides such as SiN and AlN and carbides such as SiC and WC. The protective coating may be either a single layer of a mixture of graphite fluoride and a hard compound formed by co-sputter deposition or a two-layer coating made up of an inner layer of a hard compound and an outer layer of sputter deposited graphite fluoride.

19 Claims, 1 Drawing Sheet

MAGNETIC RECORDING MEDIUM WITH PROTECTIVE LAYER USING GRAPHITE FLUORIDE AND METHOD OF PRODUCING SAME

BACKGROUND OF THE INVENTION

This invention relates to magnetic recording media such as magnetic disks, magnetic drums and magnetic tapes in which a layer of a magnetic recording material is formed on a substrate and is overlaid with a protective coating layer, and more particularly to the material and structure of the protective coating layer and method of forming that layer.

For storage of information for computers, so-called hard disks and floppy disks using a thin film of magnetic metal as the recording medium have very rapidly and widely spread in recent years, and to keep up with the trend toward such disk memories more enhancement of recording density is growingly required of each magnetic recording device. One way to enhance recording density is decreasing the magnetic head-to-recording medium spacings, and in this regard not only a reduction in the flying height of the magnetic head but also a reduction in the thickness of the protective film on the recording medium have become important tasks.

The protective film on the magnetic recording medium is required to be high in wear resistance to withstand the rubbing contact with the magnetic head at starting and stopping the operation of the recording device. Besides, corrosion resistance is required of the protective film to prevent the underlying magnetic film from corrosion particularly when the magnetic film is a metal film which is more susceptible to corrosion than a magnetic oxide film. In most of conventional magnetic recording media the protective film is formed of a stable and hard oxide represented by $SiO_2$, and in some cases carbon is used as the protective material in view of its lubricity.

Regarding thinning of the protective film for the purpose of enhancing recording density, it is accepted that the protective film thickness has to be reduced to less than 50 nm to realize recording density of 50 kilobites per inch or above. However, it is very difficult to ensure mechanical durability and weatherability of the recording medium by a protective film of such a reduced thickness. Particularly in magnetic memories using a thin film of metal as the recording medium it becomes impracticable to completely prevent occurrence of bit errors attributed to corrosion by using a conventional material for the protective film.

U.S. Pat. No. 4,411,963 relates to magnetic recording media and proposes to overlay a magnetic metal film with a film of either corrosion resistant metal such as gold and/or tantalum or refractory carbide or nitride of, for example, silicon. However, the corrosion resistant metal film will be insufficient in wear resistance. In the case of a refractory carbide or nitride film, the film is very high in hardness and also in the coefficient of friction and, therefore, is likely to damage the magnetic head. In practice it will be necessary to apply a liquid lubricant to such a hard protective film. However, use of a liquid lubricant entails extra cost and offers disadvantages such as possibility of cohesion of the magnetic head and the protective film and accumulation of dust.

SUMMARY OF THE INVENTION

It is an object of the present invention to provide a magnetic recording medium having a protective coating layer which is excellent in both mechanical durability and corrosion resistance even when it is a very thin film.

It is another object of the invention to provide method of producing a magnetic recording medium according to the invention.

According to the invention the protective coating layer, which overlies a layer of a magnetic recording material, is provided by jointly using graphite fluoride, a common name of poly(carbon fluoride), and at least one inorganic nonmetallic hard compound which can be selected from some oxides, nitrides and carbides.

More specifically, the protective layer according to the invention is either a single layer formed of a mixture of graphite fluoride and the nonmetallic hard compound(s) or a two-layer coating made up of an inner layer which directly overlies the magnetic recording layer and is formed of the nonmetallic hard compound(s) and an outer layer formed of graphite fluoride.

In the case of using the aforementioned mixture the protective layer is formed by co-sputter depositing graphite fluoride and the selected nonmetallic hard compound(s) on the magnetic recording layer, preferably in a gas atmosphere comprising fluorine gas. The protective layer of two-layer structure is formed by first forming the inner layer of the selected nonmetallic hard compound(s) by sputtering or any other suitable technique and then sputter depositing graphite fluoride on the inner layer, preferably in a gas atmosphere comprising fluorine gas. In either case it is free to jointly use two or more kinds of nonmetallic hard compounds, but usually it suffices to use only one kind of hard compound.

Of all the industrial materials now available, graphite fluoride is the lowest in surface energy. Accordingly graphite fluoride is excellent in lubricity and exhibits water repellency better than polytetrafluoroethylene (PTFE). Furthermore, graphite fluoride is very high in chemical stability and is comparable to PTFE in acid resistance, alkali resistance, and so on. Therefore, a coating layer of graphite fluoride is highly effective for prevention of corrosion of the underlying layer of a magnetic recording material, which may be a metal or alloy, even under very high humidity conditions.

However, graphite fluoride is not very high in mechanical strength since this substance has a lamellar structure in which the force of bond in the direction of c-axis is van der Waals force. Therefore, if graphite fluoride alone is used as the material of the protective layer problems will arise in respect of wear resistance and mechanical durability including resistance to head crush.

According to the invention such shortcomings of graphite fluoride are ingeniously compensated, while fully retaining the important merits of same, by either dispersing the selected hard compound(s) in graphite fluoride or underlaying a graphite fluoride layer with a layer of the selected hard compound(s). Consequently, a protective coating layer according to the invention exhibits excellent resistance to corrosion and is sufficiently high in mechanical strength, so that the magnetic recording medium is greatly improved in mechanical durability. This invention will make a contribution to enhancement of recording density since the protective layer can be made very thin.

This invention can be embodied in various types of magnetic recording media such as magnetic disks, magnetic drums and magnetic tapes.

DESCRIPTION OF THE PREFERRED EMBODIMENTS

Figure 1:
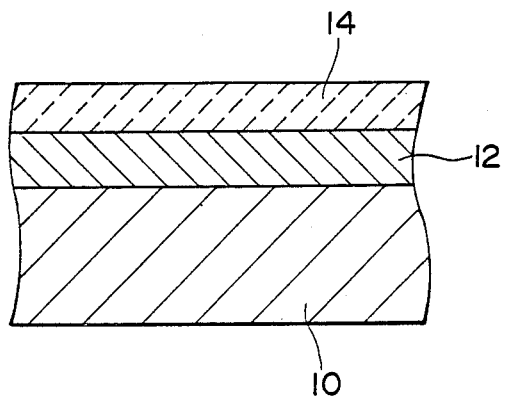
FIG. 1 is a fragmentary, sectional and explanatorily enlarged view of a magnetic disk as an embodiment of the present invention.

FIG. 1 shows a magnetic disk in which the present invention is embodied. As is usual the magnetic disk has a magnetic recording layer 12, i.e. a layer of a magnetic recording material, coated or deposited on a major surface of a substrate 10. The magnetic recording layer 12 is overlaid with a protective layer 14 according to the invention. The material of the substrate 10 is not limited and may be a metal, glass, synthetic resin or ceramics. The substrate surface to be laid with the magnetic recording layer 12 needs to be a very smooth surface. According to the need the substrate 10 may be coated or plated with a selected nonmagnetic material which can be lapped and polished so as to provide a sufficiently smooth surface. The material of the magnetic recording layer 12 is selected from the conventional materials, and this layer is formed by a conventional technique.

In this embodiment of the invention the protective layer 14 is formed of a mixture of a nonmetallic hard compound and graphite fluoride. The nonmetallic hard compound can be selected from metal oxides such as silica, alumina and zirconia, carbides such as silicon carbide and tungsten carbide and nitrides such as silicon nitride and aluminum nitride. The proportion of graphite fluoride to the nonmetallic hard compound is not strictly limited, but in general it is suitable that graphite fluoride amounts to 10–50 vol. %, and preferably 20–40 vol. %, of the protective layer 14. This protective layer 14 is formed by co-sputter depositing graphite fluoride and a selected nonmetallic hard compound on the surface of the magnetic recording layer 12. Preferably the co-sputter deposition is carried out in a gas atmosphere containing fluorine gas.

Figure 2:
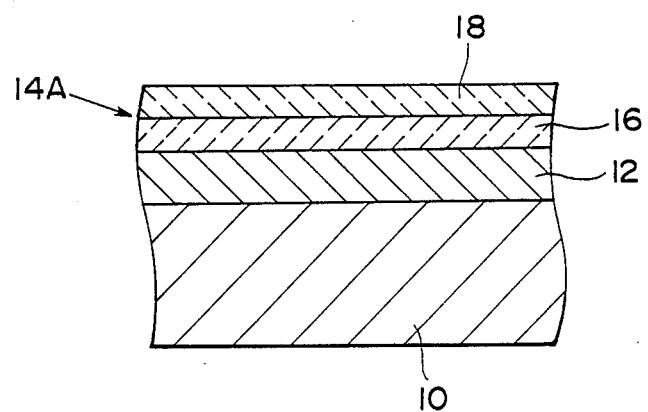
FIG. 2 is a similar view of another magnetic disk embodying the present invention.

FIG. 2 shows a magnetic disk in which the present invention is embodied in another way. In this magnetic disk both the substrate 10 and the magnetic recording layer 12 are as described above with respect to the embodiment shown in FIG. 1. In this embodiment the magnetic recording layer 12 is coated with a protective layer 14A of two-layer structure consisting of an inner layer 16 formed of a nonmetallic hard compound and an outer layer 18 formed of graphite fluoride. The hard material of the inner layer 16 can be selected from the above described oxides, carbides and nitrides. The protective layer 14A of two-layer structure is formed by first forming the hard inner layer 16 on the magnetic recording layer 12 by sputtering or any other suitable technique and then sputter depositing a film of graphite fluoride 18 on the hard inner layer 16, preferably in a gas atmosphere containing fluorine gas.

The invention is further illustrated by the following nonlimitative examples.

EXAMPLES 1-6

In these examples magnetic disks of the construction shown in FIG. 1 were produced by alternately using six kinds of materials for the protective layer 14.

In every example an aluminum alloy disk was used as the substrate 10. Preparatory to formation of the magnetic recording layer 12, a nonmagnetic Ni-P alloy was deposited on the surface of the aluminum alloy substrate 10 to a thickness of 80 $\mu$m by an electroless plating method, and the Ni-P coating film was lapped and polished to control the surface roughness to about 20 nm. The magnetic recording layer 12 was formed by depositing a Co-Ni-P alloy onto the polished Ni-P surface of the substrate 10 to a thickness of 60 nm by an electroless plating method.

In Example 1, the protective layer 14 was a film of a mixture of $SiO_2$ and graphite fluoride, which was formed to a thickness of 40 nm by a co-sputter deposition method using $SiO_2$ and graphite fluoride as two targets, respectively, and a mixed gas of argon, methane and fluorine as the sputtering gas. In Examples 2-6, the hard component of the protective layer 14 was changed to $Al_2O_3$, SiN, AlN, SiC and WC, respectively, and in every example the protective layer 14 of a mixture of the selected hard compound and graphite fluoride was formed to a thickness of 40 nm by co-sputter deposition. Throughout Examples 1 to 6, the proportion of graphite fluoride to the oxide, nitride or carbide was in the range from 1:2 to 1:4 by volume.

EXAMPLES 7-12

In these examples magnetic disks of the construction shown in FIG. 2 were produced by alternately using six kinds of hard compounds to form the inner layer 16 of the protective layer 14A of two-layer structure. In every example the substrate 10 and the magnetic recording layer 12 were as described in Example 1.

In Example 7, the inner layer 16 of the protective layer 14A was formed by depositing $SiO_2$ onto the magnetic recording layer 12 to a thickness of 20 nm by RF magnetron sputtering method. Then the outer layer 18 was formed by depositing graphite fluoride to a thickness of 20 nm by RF magnetron sputtering method.

In Examples 8-12 the material of the inner layer 16 was changed to $Al_2O_3$, SiN, AlN, SiC and WC, respectively, and the double-coating process of Example 7 was repeated. In every example each of the inner and outer layers 16 and 18 was 20 nm in thickness.

Samples of the magnetic disks of Examples 1-12 were subjected to the evaluation tests described below.

For comparison, three kinds of magnetic disks not in accordance with the invention were produced as Comparative Examples 1, 2 and 3, respectively, and subjected to the same tests. In every case the substrate and the magnetic recording layer were as described in Example 1. In Comparative Example 1, $SiO_2$ alone was sputter deposited on the magnetic recording layer to a thickness of 50 nm. In Comparative Example 2, spin coating method was employed for forming a $SiO_2$ film having a thickness of 50 nm on the magnetic recording layer. In Comparative Example 3 graphite fluoride alone was sputter deposited on the magnetic recording layer to a thickness of 50 nm.

EVALUATION TESTS

For evaluation of corrosion resistance, samples of the magnetic disks were kept for 250 hr in an environmental testing apparatus maintained at a temperature of 80° C. and at a relative humidity of 85%, and the bit error rate of each sample was measured before and after exposure to the hot and humid atmosphere. The measurements were as shown in the following table.

| Magnetic Disk | Hard Compound mixed with graphite fluoride | Hard Compound used as underlayer | Number of Bit Errors | |
|---|---|---|---|---|
| | | | before testing | after testing |
| Ex. 1 | SiO$_2$ | — | 24 | 26 |
| Ex. 2 | Al$_2$O$_3$ | — | 10 | 15 |
| Ex. 3 | SiN | — | 2 | 8 |
| Ex. 4 | AlN | — | 14 | 19 |
| Ex. 5 | SiC | — | 5 | 6 |
| Ex. 6 | WC | — | 7 | 8 |
| Ex. 7 | — | SiO$_2$ | 15 | 19 |
| Ex. 8 | — | Al$_2$O$_3$ | 29 | 35 |
| Ex. 9 | — | SiN | 32 | 36 |
| Ex. 10 | — | AlN | 4 | 5 |
| Ex. 11 | — | SiC | 12 | 18 |
| Ex. 12 | — | WC | 41 | 45 |
| Comp. Ex. 1 | (SiO$_2$ alone: sputtering) | | 3 | 67 |
| Comp. Ex. 2 | (SiO$_2$ alone: spin-coated) | | 6 | 51 |
| Comp. Ex. 3 | (graphite fluoride alone) | | 4 | 7 |

Separate samples of the respective magnetic disks were subjected to an in-contact start/stop (CSS) test to evaluate mechanical durability of the protective layers. The CSS test was made by using a magnetic head provided on a hard ceramic slider made of alumina and titanium carbide. The head was forced toward the disk under load of 18 g, and the flying height of the head was 0.12 μm.

In the cases of the disks of Comparative Examples 1 and 2, occurrence of a powder attributed to abrasion was perceptible as the repetition of the CSS test reached 5000 times. In the disk of Comparative Example 3 the graphite fluoride film was significantly damaged while the CSS test was repeated 2000 times. In contrast, the disks of Examples 1-12 remained undamaged and unchanged even though the CSS test was repeated more than 30000 times. Of course no lubricant was applied to the tested disks. The results of this test evidence that the durability of a protective layer using graphite fluoride is remarkably enhanced by either mixing a hard compound with graphite fluoride or underlaying the graphite fluoride layer with a hard compound.

What is claimed is:

1. A magnetic recording medium, comprising: a substrate;
a magnetic recording layer which is a thin ferromagnetic metal film formed on the substrate; and
a protective layer which overlies the magnetic recording layer and is formed of a mixture of graphite fluoride and at least one inorganic nonmetallic hard compound, said graphite fluoride occupying 10-50 volume percent of said mixture.

2. A magnetic recording medium according to claim 1, wherein said at least one inorganic nonmetallic hard compound comprises an oxide.

3. A magnetic recording medium according to claim 2, wherein said oxide is selected from the group consisting of SiO$_2$ and Al$_2$O$_3$.

4. A magnetic recording medium according to claim 1, wherein said at least one inorganic nonmetallic hard compound comprises a nitride.

5. A magnetic recording medium according to claim 4, wherein said nitride is selected from the group consisting of SiN and AlN.

6. A magnetic recording medium according to claim 1, wherein said at least one inorganic nonmetallic hard compound comprises a carbide.

7. A magnetic recording medium according to claim 6, wherein said carbide is selected from the group consisting of SiC and WC.

8. A magnetic recording medium according to claim 1, wherein said graphite fluoride occupies 20-40 volume % of said mixture.

9. A magnetic recording medium, comprising:
a substrate;
a magnetic recording layer which is a thin ferromagnetic metal film formed on the substrate;
an inner protective layer which overlies the magnetic recording layer and is formed of at least one nitride selected from the group consisting of SiN and AlN; and
an outer protective layer which overlies the inner protective layer and is formed of graphite fluoride.

10. A method of producing a magnetic recording medium, comprising the steps of:
forming a thin ferromagnetic metal film to be used as a magnetic recording layer on a substrate; and
co-sputter depositing graphite fluoride and at least one inorganic nonmetallic hard compound on the ferromagnetic metal film so as to form a protective layer of a mixture 10-50 volume % of graphite fluoride and the balance of said at least one hard compound.

11. A method according to claim 10, wherein said at least one inorganic hard compound comprises an oxide.

12. A method according to claim 10, wherein said at least one inorganic hard compound comprises a nitride.

13. A method according to claim 10, wherein said at least one inorganic nonmetallic hard compound comprises a carbide.

14. A method according to claim 10, wherein said mixture contains 20-40 volume % of graphite fluoride.

15. A method according to claim 12, wherein said nitride is selected from the group consisting of SiN and AlN.

16. A method of producing a magnetic recording medium, comprising the steps of:
forming a thin ferromagnetic metal film to be used as a magnetic recording layer on a substrate;
overlaying the ferromagnetic metal film with an inner protective layer formed of at least one nitride selected from the group consisting of SiN and AlN; and
sputter depositing graphite fluoride on the inner protective layer to form an outer protective layer formed of graphite fluoride.

17. A method according to claim 16, wherein said at least one inorganic hard compound comprises an oxide.

18. A method according to claim 16, wherein said at least one inorganic hard compound comprises a nitride.

19. A method according to claim 16, wherein said at least one inorganic nonmetallic hard compound comprises a carbide.

* * * * *